United States Patent Office 3,492,345
Patented Jan. 27, 1970

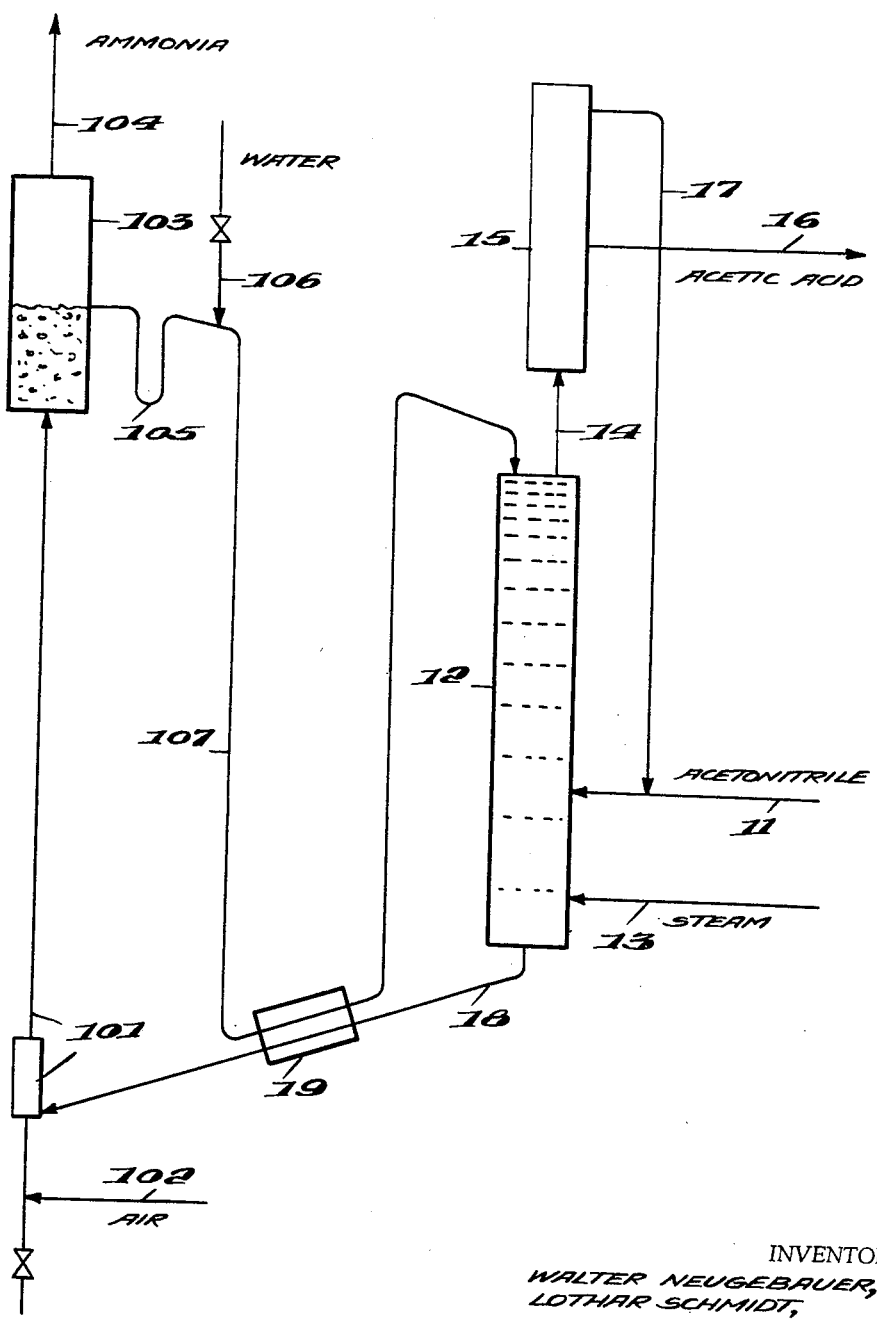

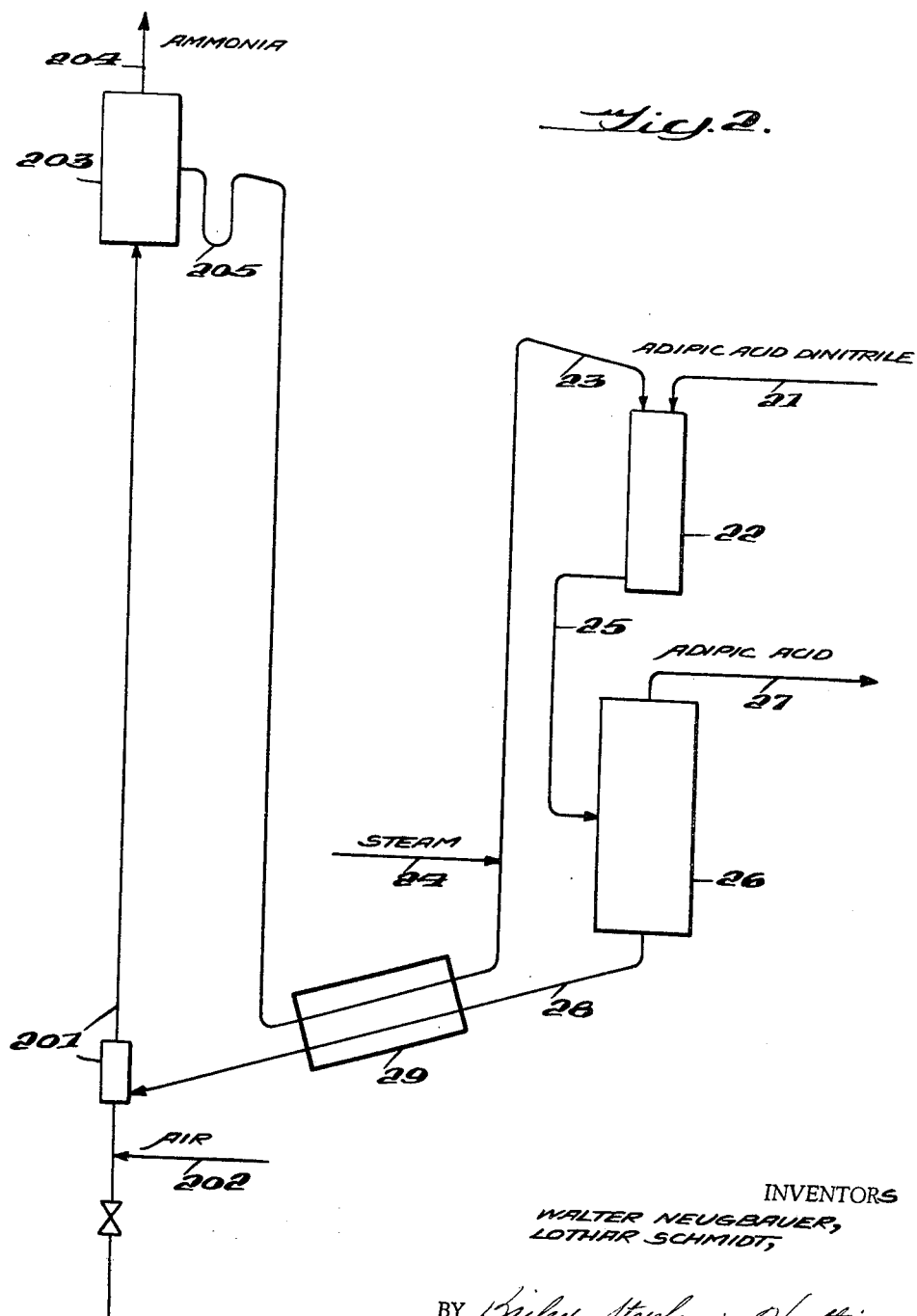

3,492,345
PROCESS FOR HYDROLYSIS OF NITRILES WITH RECOVERY OF NITROGEN VALUES DERIVED FROM THE NITRILE GROUP
Walter Neugebauer and Lother Schmidt, Constance (Bodensee), Germany, assignors to Deutsche Gold- und Silber-Scheideanstalt vormals Roessler, Frankfurt am Main, Germany
Continuation-in-part of application Ser. No. 377,711, June 24, 1964. This application June 4, 1965, Ser. No. 465,826
Int. Cl. C07c 51/08
U.S. Cl. 260—514        8 Claims

ABSTRACT OF THE DISCLOSURE

Process for the hydrolysis of carboxylic acid nitriles wherein such nitriles are contacted with an acid salt melt in the presence of the quantity of water required for the hydrolysis at a temperature up to 300° C. sufficient to effect the hydrolysis, separating the carboxylic acid hydrolysation product from the melt and heating the remaining melt to a higher temperature to drive out the ammonia taken up in the hydrolysis.

---

This is a continuation-in-part of application Ser. No. 377,711, filed June 24, 1964, now abandoned.

The present invention relates to an improved process for the hydrolysis of organic nitriles to produce the corresponding carboxylic acids with recovery of nitrogen values derived from the hydrolyzed nitrile group.

The production of carboxylic acids and carboxylic acid esters by hydrolysis of the corresponding nitriles is a procedure often used in chemical technology. Such hydrolysis is often designated as a saponification and often carried out in the presence of strong acids, such as sulfuric acid. The action of the sulfuric acid employed is twofold, namely, first in forming an acid medium which promotes the rapidity of the hydrolysis and secondly in shifting the equilibrium in favor of the hydrolysis towards the formation of the hydrolyzation product by binding the ammonia produced as ammonium bisulfate.

The disadvantages of this process reside in the consumption of the sulfuric acid used which is converted to ammonium bisulfate and in the occurrence of undesired side reactions which are caused by the oxidizing and strong dehydrating action of the sulfuric acid. Also, the nitrogen contained in the nitrile group is transformed into ammonium bisulfate and in general cannot be economically recovered therefrom. The ammonium bisulfate containing exhaust liquors from such process are quite contaminated and usually colored black by organic decomposition products contained therein which render the processing to ammonium sulfate difficult if not impossible.

According to the invention it was found that the hydrolysis of nitriles could be effected by reacting the nitrile compounds to be converted with water or water yielding substances in the presence of acid melts, for example, of sodium bisulfate, recovering the carboxylic acid formed from the melt and regenerating the melt containing the nitrogen derived from the nitrile group in the form of ammonium ions by heating it to higher temperatures to effect ammonia desorption.

The ammonia produced in the hydrolysis is taken up extraordinarily quickly, possibly, in statu nascendi, by the acid melt and surprisingly is so firmly held therein that it upon removal of the acid remains in the melt.

An especial advantage of the process according to the invention is that hardly any decomposition products and especially no oxidation products, as occur when sulfuric acid is used, occur when the hydrolysis is carried out in the presence of acid melts even at relatively high temperatures such as, for example, 200° C. This is quite apparent from the fact that the acid melts even when these are recycled and therefore used for the hydrolysis a number of times do not become discolored.

The acid melts used according to the invention are melts of such substances which contain acid hydrogen atoms and the term acid melt is employed herein to signify this type of melt. Preferably, the acid salts of phosphoric or sulfuric acid, especially the acid alkali metal and ammonium salts of such acids, are employed for the production of such melts. In order to avoid decomposition of the nitriles, the hydrolyzation products and/or the ammonia as much as possible, it is advisable to produce the melt from components having the lowest possible melting points. The use of such low melting substances in addition facilitates the technical operation of the process and provides advantages in heat economy. In view of their low melting points, ammonium hydrogen sulfate, potassium hydrogen sulfate, sodium hydrogen sulfate and potassium hydrogen phosphate are particularly advantageous for the purposes of the invention.

In order to attain as low a melting point as practical further substances may be added which induce a lowered melting point of the resulting mixture in a known manner. For example, salt mixtures such as, for example, of sodium and potassium hydrogen sulfates can be used. For instance, a mixture of 56.5 mol percent of sodium hydrogen sulfate and 43.5 mol percent of potassium hydrogen sulfate already melts at the very advantageous temperature of 1250° C. Moreover the addition of lithium hydrogen sulfate and/or cesium hydrogen sulfate can, for example, lower the melting point of such mixtures to a temperature below 100° C. such as, for example, to about 90° C. down to about 80° C.

In general, the temperature employed for the hydrolysis according to the invention should not exceed that at which the vapor pressure of ammonia will become inconvenient. Expediently, temperatures at or below about 300° C. are employed.

The ammonia desorption velocity of the melt can be increased by the addition of neutral salts such as the alkali metal sulfates or phosphates. It is not necessary that the acid melt employed according to the invention be completely in the form of a homogeneous liquid phase. It is also possible within the purview of the invention to employ melts in which a portion of the salts contained therein are present in solid form. This applies to both the neutral salts and the acid salts. Also the ammonia salts which are formed from the ammonia taken up can be present partially or completely in the solid form. The solid salts are suspended in the melt so that difficulties in handling such melts do not occur.

As has already been indicated, the present process in contrast to those previously employed does not require sulfuric acid or other strong mineral acids. Furthermore, the process according to the invention does not lead to the production of ammonia salts which are difficult to process such as ammonium hydrogen sulfate. As a consequence, the necessity of eliminating ammonium hydrogen sulfate from the waste products of the process is avoided. Under present day requirements as to purity of waste exhausted from industrial and chemical plants, the cost of such elimination can be rather significant.

A further advantage of the present process is the possibility of recovering the nitrogen derived from the nitrile group in the form of ammonia which in many cases can be reused in the production of the starting nitrile. The mild reaction conditions required as contrasted to those when sulfuric acid is employed render it possible to effect a substantial reduction or a complete elimination of undesired decomposition products.

The process according to the invention can be carried out especially advantageously in a continuous manner in which the melt, after havig been freed of the ammonia taken up thereby and cooling, is recycled to the hydrolysis step. For this purpose it is not necessary to drive out the ammonia from the melt completely and it is possible to recycle a portion of the ammonium ions taken up together with the melt. This is of particular significance for while the main portion of the ammonia taken up can be driven out easily and quickly, the last remnants are more difficult to drive out. In a continuous operation of the process it is possible to adhere to more exactly defined reaction conditions and, especially, the acidity in the hydrolysis step can always be reproducibly adjusted to the same value.

In carrying out the process according to the invention, the nitriles to be converted, which can be of aliphatic, cycloaliphatic or aromatic nature, can be supplied together with water to the acid melt in solid, liquid or gaseous form, any heat necessary for the fusion or evaporation is supplied directly through the melt or indirectly with the aid of a heat exchanger.

The nitrogen derived from the nitrile group which after completion of the hydrolysis is present in the melt in the form of ammonium ions and/or in the form of a suspension of very finely divided ammonium salt crystals is recovered after removal of the carboxylic acid formed from the melt and any remaining unconverted nitrile by heating the melt to temperatures higher than those employed for the hydrolysis in order that it be driven off as gaseous ammonia. The removal of such ammonia is effected at temperatures between 300 and 450° C., preferably, between 350 and 400° C. The recovery of the carboxylic acid produced from the melt can be assisted by stripping with a carrier gas such as steam, air or nitrogen.

In order that the desorption of the ammonia be accelerated, it can be of advantage to pass an inert gas, such as steam, hydrogen, nitrogen or air, through the melt. The melt can contain excess water derived from the hydrolysis which is completely or partially driven out during the ammonia desorption. The aqueous ammonium hydroxide solution obtained in this way can be processed to dry ammonia gas in a known manner, for example, by distillation under pressure. At higher desorption temperatures, a slight thermal decomposition of the hydrogen sulfate into pyrosulfate and water may occur, especially, when the melt has a high sodium content. This can lead to an undesired increase in the viscosity of the melt, but this can easily be corrected by the introduction of a corresponding amount of water or steam so that the original composition of the melt is restored.

In the accompanying drawings:

FIG. 1 diagrammatically shows an apparatus suitable for carrying out the process according to the invention for the hydrolysis of acetonitrile; and FIG. 2 diagrammatically shows an apparatus suitable for carrying out the process according to the invention for the hydrolysis of adipic acid dinitrile.

In FIG. 1, gaseous acetonitrile is supplied over conduit 11 into reaction 12 to the top of which the acid melt is supplied over conduit 107. Steam is supplied to such reaction column through conduit 13. A temperature of 180° C. is maintained in the reaction column and the acetonitrile is hydrolyzed by the steam in the presence of the acid melt to form acetic acid vapors and ammonium ions. The acetic acid leaving the top of the reaction column together with the steam and unconverted acetonitrile is supplied to fractionating column 15 over conduit 14. The concentrated acid is withdrawn from fractionating column 15 in liquid form over conduit 16.

The unconverted acetonitrile is returned to column 12 over conduits 17 and 11. The steam required for the hydrolysis expediently is supplied to the bottom of column 12 over conduit 13 in order to strip out any acetic acid which might reach the bottom of the column with the melt.

The melt leaving the bottom of reaction column 12 over conduit 18 is passed through heat exchanger 19 into a gas lift pump 101 in which it is transmitted to desorption vessel 103 by the hot air supplied through conduit 102. The temperature maintained in the gas lift pump and the desorption vessel 103 is 380° C. At such temperature the bound ammonia taken up by the melt is set free and leaves vessel 103 through conduit 104. The melt which has been thus freed of ammonia is recycled over siphon 105 through heat exchanger 19 and conduit 107 to reaction column 12. Water can be supplied to the melt over conduit 106 to reconvert any pyrosulfate formed during the high temperature ammonia desorption into hydrogen sulfate. Such water can be supplied as steam or in the liquid phase.

Although the simultaneous transmission of the melt and ammonia desorption with the aid of gas lift pump may be of advantage, there are other possibilities for effecting the ammonia desorption. For example, the desorption can be effected between reaction vessel 12 and pump 101 or after pump 101. In these embodiments the temperature in the pump can be selected so that practically no ammonia is given off to the pumping gas. It also is possible to supply a part or all of the water required for the entire process to the melt in the pump or to run the pump with steam as the pumping gas.

In FIG. 2 liquid adipic acid dinitrile is supplied to reaction vessel 22 over conduit 21 whereas the acid melt is supplied thereto over conduit 23. At the temperature of 190° C. which is maintained within the column, the nitrile is hydrolyzed to liquid adipic acid and ammonium ions. The intimate mixture of finely divided adipic acid and the melt loaded with ammonium ions leaves reaction vessel 22 through conduit 25 and is supplied to phase separating vessel 26 from which the specifically lighter adipic acid is withdrawn at the top through conduit 27 and ammonium ion containing melt from the bottom. The melt flows over conduit 28 and heat exchanger 29 into gas lift pump 201 in which it is transmitted to vessel 203 by the hot air supplied at 202. The bound ammonia in the melt is set free in the gas lift pump 201 and vessel 203 which are maintained at 360° C. The ammonia leaves the desorption vessel 203 over conduit 204. The melt which has been freed of the ammonia taken up is recycled to reaction vessel 22 over siphon 205, heat exchanger 29 and conduit 23. The water required for the process is supplied through conduit 24 in the form of steam or as a liquid.

The following examples will serve to illustrate the process according to the invention:

EXAMPLE 1

78.2 g. of acetonitrile and 95 g. of water were reacted in vapor phase with a melt of a mixture of potassium hydrogen sulfate, sodium hydrogen sulfate and ammonium sulfate in a molar ratio of 24:28:1 at a temperature of 180° C. 135.0 g. of an 80.4% aqueous solution of acetic acid containing 108.5 g. of pure acetic acid were obtained. The yield therefore was 94.8% based upon the acetonitrile supplied.

The melt which had been freed of acetic acid was heated to 380° C. and nitrogen passed therethrough to drive out the ammonia. 29.4 g. were recovered in this manner corresponding to a 95.7% yield based upon the ammonia produced in the hydrolysis. After replacement of the water which had been driven out together with the ammonia, the analytical composition of the melt corresponded to that of the original melt supplied.

EXAMPLE 2

78.2 g. of acetonitrile and 92.5 g. of water were reacted in the vapor phase with an acid melt of a mixture of potassium hydrogen sulfate, sodium hydrogen sulfate, ammonium sulfate and partially dissolved and partially suspended finely crystalline potassium sulfate in a molar ratio of 46:53:2:4 at a temperature of 180° C. 130.5 g. of an 81.6% aqueous acetic acid solution containing 106.5 g. of pure acetic acid were obtained. The yield amounted to 93% based upon the acetonitrile supplied.

29.3 g. of ammonia were recovered from the melt, after it had been freed of the acetic acid produced, by heating such melt to 360° C. This amounted to 97.4% of the quantity to be expected. After replacement of water which had been driven out together with the ammonia, the analytical composition of the melt corresponded to that of the original melt supplied.

EXAMPLE 3

78.2 g. of acetonitrile and 95 g. of water were contacted in the gaseous phase with an acid melt of a mixture of potassium hydrogen sulfate, sodium hydrogen sulfate, potassium dihydrogen phosphate and ammonium sulfate in a molar ratio of 44:50:11:2 at 180° C. 132 g. of an 80.2% aqueous acetic acid solution containing 105.8 g. of pure acetic acid were obtained. The yield therefore was 92.5% based upon the acetonitrile supplied.

After removal of the acetic acid produced the melt was heated to 380° C. by passing heated air therethrough. 28.7 g. (96% of theory) of ammonia were recovered. After replacement of water which had been driven out together with the ammonia, the analytical composition of the melt corresponded to that of the original melt supplied.

EXAMPLE 4

80 g. of acrylonitrile and 270 g. of water were contacted in the gaseous phase with an acid melt of a mixture of potassium hydrogen sulfate, sodium hydrogen sulfate and ammonium sulfate in a molar ratio of 24:28:1 at a temperature of 190° C. In order to avoid occurrence of polymerization, the apparatus was rinsed with $CO_2$ and a small quantity of copper powder and of hydroquinone monomethyl ether were added to the melt. 311.4 g. of a 30.8% aqueous solution of acrylic acid were obtained. This corresponds to 95.8 g. of pure acrylic acid and therefore an 88.2% yield based on acrylonitrile supplied.

The melt was heated to 380° C. by the introduction of hot nitrogen. 21.5 g. (95.2% of theory) of ammonia were thus recovered. After replacement of water which had been driven out together with the ammonia, the analytical composition of the melt corresponded to that of the original melt supplied.

EXAMPLE 5

30.0 g. of adipic acid dinitrile and 20 g. of water were contacted with a melt of a mixture of potassium hydrogen sulfate, sodium hydrogen sulfate, ammonium sulfate and sodium sulfate in a molar ratio of 24:28:2:1 at 190° C. The adipic acid produced was removed from the melt. It possessed a melting point of 149–151° C. and after recrystallizing once from ethyl acetate a melting point of 151–153° C. 37.5 g. of adipic acid or a yield of 92.5% based upon the adipic acid dinitrile supplied were obtained.

When the melt which had been freed of adipic acid was heated to 360° C. by the introduction of hot air, 9 g. of ammonia were recovered therefrom. This corresponds to a 95.3% yield based upon the adipic acid dinitrile supplied. After replacement of water which had been driven out together with the ammonia, the analytical composition of the melt corresponded to that of the original melt supplied.

EXAMPLE 6

35.0 g. of commercial terephthalic acid dinitrile with a 97% nitrile content were contacted with a melt of a mixture of potassium hydrogen sulfate, sodium hydrogen sulfate, ammonium sulfate and sodium sulfate in a molar ratio of 24:28:2:1 at 270° C. The terephthalic acid produced was removed from the melt. 41.1 g. of pure terephthalic acid corresponding to a yield of 93.4% based upon the terephthalic acid dinitrile supplied were obtained.

The water required for the hydrolysis was supplied, in situ, by the formation of pyrosulfate from the bisulfates. No reduction in the velocity of the reaction was engendered by such in situ supply of the water.

When the melt which had been freed of terephthalic acid was heated to 360° C. by the introduction of hot air, 7.95 g. of ammonia were recovered therefrom. This corresponds to a 94.4% yield based upon the ammonia produced during the hydrolysis. After replacement of the water which had been taken out of the melt by hydrolysis with the formation of pyrosulfates and of the water which had been driven out together with the ammonia, the analytical composition of the melt corresponded to that of the original melt supplied.

EXAMPLE 7

35 g. of cyclopropyl cyanide and 18 g. of water were brought into intimate contact with a melt of a mixture of potassium bisulfate, sodium bisulfate, caesium bisulfate, lithium bisulfate and ammonium sulfate in a molar ratio of 12:12:8:12:1 maintained at a temperature of 120–125° C. The cyclopropane monocarboxylic acid formed was separated from the melt. Such acid after drying with anhydrous sodium sulfate had a melting point of 16.5° C., a boiling point of 181–182° C. at 730 torr, and a refractive index $n_D = 1.4371$ (20.9° C.). The yield was 38.7 g. or 86% of theory based on the cyclopropyl cyanide supplied.

After the melt had been separated from the acid produced, 7.5 g. of ammonia were recovered therefrom by heating such melt to 360° C. and passing of air therethrough. This corresponds to a yield 98% of theory with reference to the ammonia produced in the hydrolysis. After replacement of water which had been driven out together with the ammonia, the analytical composition of the melt corresponded to that of the original melt supplied.

EXAMPLE 8

30 g. of adipic acid dinitrile and 20 g. of water were brought into intimate contact with a melt of a mixture of potassium bisulfate, sodium bisulfate, caesium bisulfate, lithium bisulfate and ammonium sulfate in a molar ratio of 12:12:8:12:1 maintained at a temperature of 93–97° C. The adipic acid formed was separated from the melt. Such acid after being washed with a little benzene to remove the unconverted nitrile had a melting point of 152–153° C. The yield was 32.6 g. or 80.3% of theory upon the basis of the adipic acid dinitrile supplied.

After the melt had been separated from the acid produced, 7.4 g. of ammonia were recovered therefrom by heating such melt to 360° C. and passing of air therethrough. This corresponds to a yield 97.5% of theory with reference to the ammonia produced in the hydrolysis. After replacement of water which had been driven out together with the ammonia, the analytical composition of the melt corresponded to that of the original melt supplied.

EXAMPLE 9

35 g. of commercial terephthalic acid dinitrile with a nitrile content of 97% and 20 g. of water were brought into intimate contact with a melt of a mixture of potassium bisulfate, sodium bisulfate, ammonium sulfate and sodium sulfate in a molar ratio of 24:28:2:1 maintained at 190° C. The terephthalic acid formed was separated from the melt. The yield was 37.2 g. or 84.5% based on the terephthalic acid dinitrile supplied.

After the melt had been separated from the acid produced 7.4 g. of ammonia were recovered therefrom by heating such melt to 360° C. and passing of air therethrough. This corresponds to a yield 97% of theory with reference to the ammonia produced in the hydrolysis. After replacement of water which had been driven out together with the ammonia, the analytical composition of the melt corresponded to that of the original melt supplied.

We claim:
1. In a process for the hydrolysis of a carboxylic acid nitrile with water under acid conditions to produce the corresponding carboxylic acid and for recovery of a nitrogen value derived from the nitrile group the steps of contacting such carboxylic acid nitrile in the presence of at least the theoretical quantity of water required for the hydrolysis with an acid salt melt wherein the salt is a salt of sulfuric acid or phosphoric acid at a temperature up to 300° C. sufficient to effect the hydrolysis, separating off the carboxylic acid hydrolyzation product from the melt and heating the remaining melt to a higher temperature above 300° C. to drive out the ammonia taken up during the hydrolysis.

2. The process of claim 1 in which the hydrolysis step is carried out at a temperature between about 80 and 300° C.

3. The process of claim 1 in which the melt is heated to a temperature between 300 and 450° C. to drive out the ammonia.

4. The process of claim 1 in which the melt is heated to a temperature between 350 and 400° C. to drive out the ammonia.

5. The process of claim 1 in which said melt contains at least one acid salt selected from the group consisting of ammonium and alkali metal hydrogen phosphates and hydrogen sulfates.

6. The process of claim 5 in which said melt in addition contains at least one neutral salt selected from the group consisting of ammonium and alkali metal sulfates and phosphates.

7. The process of claim 1 comprising in addition passing an inert gas through the melt when it is heated to drive out the ammonia.

8. In a process for the hydrolysis of a carboxylic acid nitrile with water under acid conditions to produce the corresponding carboxylic acid and for recovery of a nitrogen value derived from the nitrile group the steps of continuously supplying such carboxylic acid nitrile and at least the theoretical quantity of water required for the hydrolysis to an acid salt melt wherein the salt is a salt of sulfuric acid or phosphoric acid and contacting said nitrile in the presence of at least the theoretical quantity of water required for the hydrolysis with the melt in a reaction space to the temperature up to 300° C. sufficient to effect the hydrolysis, separating off the carboxylic acid hydrolyzation product from the melt, heating the remaining melt to a higher temperature over 300° C. to drive out the ammonia taken up during the hydrolysis and recycling the melt from which the ammonia has been driven off to the reaction space.

References Cited
UNITED STATES PATENTS 2,489,348 11/1949 Wenner _____ 260—515
2,526,310 10/1950 Wiley et al. _____ 260—526 X JAMES A. PATTEN, Primary Examiner U.S. Cl. X.R.

260—515, 526, 537, 540, 541